3,059,998
RECOVERY OF BERYLLIUM FROM ACID LEACH SOLUTIONS
William A. Mod, Lake Jackson, and Charles W. Becker, Angleton, Tex., assignors to The Dow Chemical Company, Midland, Mich., a corporation of Delaware
No Drawing. Filed Nov. 8, 1961, Ser. No. 150,868
5 Claims. (Cl. 23—183)

This invention pertains to an improved process for the recovery of beryllium from acid leach solutions. More particularly it pertains to a process for the recovery of the beryllium from solutions containing a relatively high concentration of calcium.

Various methods are used for recovery of beryllium from beryllium-containing ores. The beryllium may be leached from the ore without further pretreatment or the ore may be sintered with a fluxing compound to convert the beryllium into a more leachable form. In any event, acidic solutions of beryllium containing various metals such as aluminum, iron, and other metals are obtained. The concentration of the beryllium in the solution may be relatively small with the impurity metals often being present in an amount of from 2 to 25 times the concentration of the beryllium.

It is known that beryllium may be separated from the solutions by controlling the pH of the solution. By control of the pH a majority of the beryllium may be recovered from many solutions when the solution contains as impurities aluminum, iron and some other elements in more limited amount. However, in acid solutions containing a relatively high concentration of calcium, the amount of beryllium which can be recovered by this process is considerably decreased.

It is, therefore, an object of this invention to provide an improved process for the recovery of beryllium from acid leach solutions containing a relatively high concentration of calcium ions.

The above and other objects are attained according to this invention by adding to the acid leach solutions containing the beryllium, at a temperature in the range of 65 to 80° C., at least a stoichiometric amount of a soluble sulfate to react with the calcium present in the acid leach solution. After adding the soluble sulfate, the pH of the solution is adjusted by the addition of a soluble alkaline material until the pH is in the range of 3.3 to 3.7 to precipitate a substantial portion of the calcium present as calcium sulfate. The calcium sulfate so precipitated is separated from the remaining solution and then an additional amount of a soluble alkaline compound is added to the sulfate-free solution until the pH of the solution is in the range of 12 to 13. Upon increasing the pH to between 12 and 13, a precipitate is obtained which is separated from the solution and recycled back to the first step in the process. The remaining solution obtained after the precipitate is removed is boiled to hydrolyze the beryllium in the solution to beryllium hydroxide which precipitates and is then recovered from the solution.

In the work leading up to this invention it was found that when the acid solution was adjusted to a pH of 12 to 13 at the temperautre of 60 to 80° C., a portion of the beryllium is in some manner combined with the calcium and precipitates from the solution. Whether the solubility of the calcium sulfate is sufficient to provide the undesirable amounts of the calcium or whether an undesirable complex is formed prior to the calcium removal as calcium sulfate and only precipitates when the pH is in the range of 12 to 13 is not definitely known. The beryllium is combined with the calcium in such a manner that it does not decompose upon boiling. When the mixture is heated to boiling, the uncombined beryllium hydrolyzes to beryllium hydroxide and, thus, is contaminated with this mixture of calcium and beryllium. By recycling the mixture of calcium and beryllium obtained upon adjusting the pH of the solution to between 12 and 13 at temperatures in the range of 60 to 80° back to the first step in the process, this mixture of calcium-beryllium is decomposed and the beryllium can then be recovered. The amount of the calcium-beryllium product formed is in some equilibrium relationship with the amount of solution being used. Thus, in a continuous process the calcium-beryllium precipitate recycled will remain substantially constant at constant rates and not gradually accumulate. The difficulty in the recovery of the beryllium from solutions containing calcium is encountered generally with solutions where the calcium content of the solution is higher than that of other metals. Acid solutions may be obtained from leaching of bertrandite and other ores which may contain calcium in an amount of from 2 to 25 times the concentration of the beryllium and it is with these solutions that this difficulty is most predominant.

When sulfuric acid has been used as the acid for leaching of the ore, the soluble sulfates are present in sufficient amounts so that no additional sulfate need be added. Under these conditions the pH is adjusted to the range of 3.3 to 3.7 to obtain the precipitation of the calcium sulfate. When acid solutions other than the sulfate are used, a soluble sulfate such as the alkali metal sulfate is added to provide the required sulfate ion concentration. In addition to obtaining the precipitation of a calcium sulfate by adjusting the pH in the above given range the iron is also precipitated out as ferric hydroxide. Optimum results for the calcium sulfate precipitation and the iron hydroxide precipitation are obtained when the pH is adjusted to about 3.5. The precipitated calcium sulfate and ferric hydroxide are generally separated from the remaining solution such as by filtration and discarded. Additional amounts of an alkaline material such as alkali metal hydroxide, using the same one as previously added above or a different one, are added to the solution or filtrate to adjust the pH in the range of 12 to 13. It is at this stage that the calcium-beryllium precipitate is obtained. This precipitate is filtered and recycled back to the first step of the process, while the remaining filtrate is heated to boiling to separate the beryllium as beryllium hydroxide.

To further illustrate the process, an acid leach solution was obtained by leaching bertrandite ore with hydrochloric acid at a temperature of about 100° C. The concentrations of the main constituents of the solution in addition to the chloride were as follows.

| Constituents: | Concentration, grams per liter |
|---|---|
| Aluminum | 2.1 |
| Beryllium | 1.9 |
| Calcium | 32 |
| Iron | 1 |
| Fluorine | 4.9 |

To 500 milliliters of the above solution saturated sodium sulfate solution was added in a sufficient amount to react stoichiometrically with the calcium present in the solution. After the addition of the sodium sulfate, a sufficient amount of a 50 weight percent aqueous sodium hydroxide solution was added to increase the pH to 3.5. This mixture was then heated to a temperature of 70° to 80° C. and filtered. The precipitate obtained which consisted predominantly of calcium sulfate and ferric hydroxide was washed with water and the washings combined with the filtrate. To the filtrate thus free of the calcium sulfate and ferric hydroxide, an additional amount of 50 percent sodium hydroxide solution was added to increase the pH to 12 to 13. The addition of the sodium hydroxide resulted in a precipitation of a solid which was not identified, but found to contain 0.295 gm. of beryllium, 2.10 gm. of calcium and 1.65 gm. of fluoride. Filtration of this slurry yielded 1615 grams of the filtrate and upon analysis, it was found that this contained .671 gram of beryllium. Upon boiling this filtrate, the remainder of the beryllium is precipitated out as beryllium hydroxide to produce 0.658 gm. of beryllium as the hydroxide which represents only a 67.4 percent recovery.

A total of seven runs similar to that pointed out above were made. However, in the second run the precipitate of the calcium-beryllium product obtained in the first run, upon increasing the pH of the solution of 12 to 13, was recycled and used in the followign run. For example, the calcium beryllium precipitate obtained in run 1, except for the amount taken out for analysis, was recycled and used back in the feed product of run 2. From run 2, the calcium-beryllium product was added to the beginning step of run 3 and etc. By this method, 98 percent of the beryllium charged in the seventh run was recovered. The recycle precipitate of beryllium and calcium in all of the runs remained approximately same in amount as in the first run.

What is claimed is:

1. A process for the recovery of beryllium from an acid leach solution containing as an impurity calcium ion in a concentration exceeding that of the beryllium, which comprises adding to the acid leach solution at a temperature in the range of 60° to 80° C. a stoichiometric amount of a soluble sulfate to react with the calcium ions present, adding a soluble alkaline compound to the sulfate-containing solution until the pH of the solution is in the range of 3.3 to 3.7 to thereby precipitate a substantial portion of the calcium present as calcium sulfate, separating the precipitated calcium sulfate from the resulting mixture, adding additional amounts of a soluble alkaline compound to the sulfate-free solution until the pH of the solution is in the range of 12 to 13 to thereby obtain a precipitate of calcium and beryllium in a combined form, separating the precipitate of calcium and beryllium obtained and recycling it back to the first step of the process, heating the remaining solution to boiling to hydrolyze the beryllium in the solution to beryllium hydroxide, and separating the beryllium hydroxide from the remaining solution.

2. A process according to claim 1 wherein the soluble sulfate is sodium sulfate.

3. A process according to claim 2 wherein the soluble alkaline compound is an alkali metal hydroxide.

4. A process for the recovery of beryllium from a sulfuric acid leach solution containing as impurities calcium ions in an amount of from 2 to 25 times the beryllium content, which comprises adding to the acid leach solution an alkali metal hydroxide until the pH of the solution is in the range of 3.3 to 3.7 to precipitate a substantial portion of the calcium present as calcium sulfate, separating the precipitated calcium sulfate from the resulting mixture, adding additional amounts of an alkali metal hydroxide to the remaining solution until the pH of the solution is in the range of 12 to 13 to obtain a precipitate of the remaining calcium and beryllium in a combined form, separating the precipitated calcium and beryllium and recycling the precipitate back to the first step of the process above, heating the remaining solution to boiling to hydrolyze the beryllium in solution to beryllium hydroxide, and separating the beryllium hydroxide from the remaining solution.

5. A process according to claim 4, wherein the alkali metal hydroxide is sodium hydroxide.

References Cited in the file of this patent

UNITED STATES PATENTS

| | | |
|---|---|---|
| 2,899,276 | Hutter | Aug. 11, 1959 |
| 2,974,011 | Riabovol | Mar. 7, 1961 |